E. E. DAVIS.
STEERING WHEEL FOR MOTOR VEHICLES.
APPLICATION FILED JUNE 11, 1917.
1,246,244.
Patented Nov. 13, 1917.
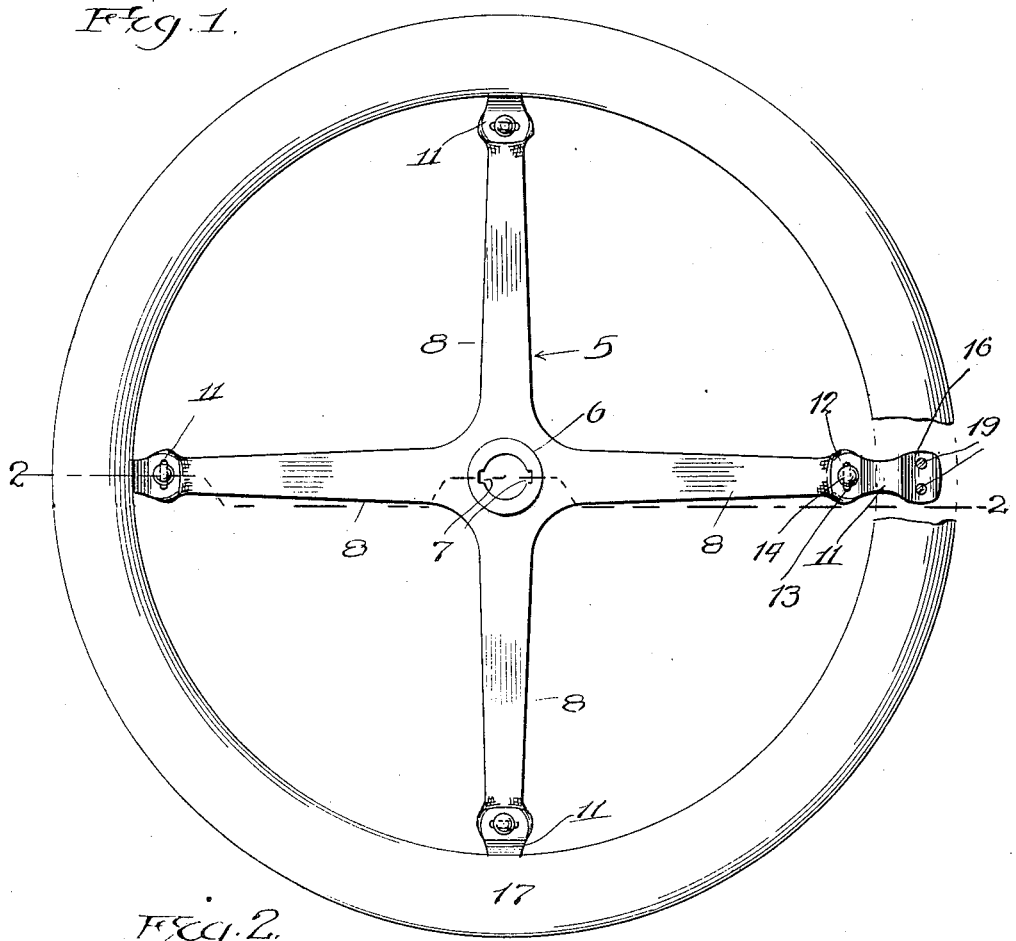
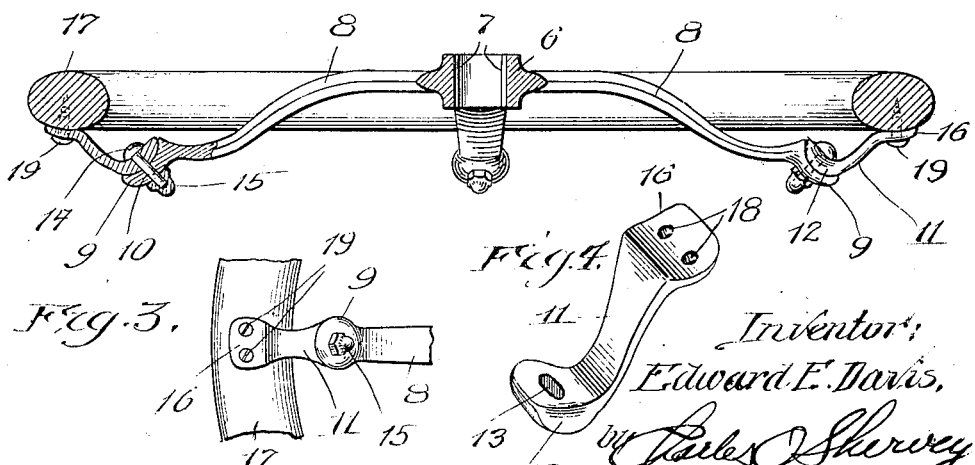

UNITED STATES PATENT OFFICE.

EDWARD E. DAVIS, OF CHICAGO, ILLINOIS, ASSIGNOR TO SECURITY AUTO LOCK COMPANY, OF CHICAGO, ILLINOIS, A CORPORATION OF ILLINOIS.

STEERING-WHEEL FOR MOTOR-VEHICLES.

1,246,244.  Specification of Letters Patent.  Patented Nov. 13, 1917.

Application filed June 11, 1917. Serial No. 174,068.

*To all whom it may concern:*

Be it known that I, EDWARD E. DAVIS, a citizen of the United States, and a resident of Chicago, county of Cook, and State of Illinois, have invented certain new and useful Improvements in Steering-Wheels for Motor-Vehicles, of which the following is declared to be a full, clear, and exact description.

This invention relates to steering wheels for motor vehicles, and its principal object is to provide means for converting a steering wheel of small diameter into a steering wheel of large diameter, whereby more leverage may be obtained to thereby facilitate the steering of the vehicle. It is well known to those skilled in this art that small steering wheels, such as are in common use upon the "Ford" automobiles and other comparatively inexpensive automobiles, are unsatisfactory because of their small size, thereby making it difficult to steer the automobile especially while driving over rough country roads. Steering wheels are somewhat costly, and it does not appeal to the average owner of a "Ford" automobile, or any other low cost automobile, to purchase a large steering wheel and substitute it for the small one forming part of the original equipment of the automobile. With the present invention, the spider or spoke portion of the original steering wheel may be retained upon the automobile, and a new rim of increased diameter, having spoke extensions attached thereto, may be substituted for the old rim, thereby providing a steering wheel of greater diameter than the original one and without much additional expense. The invention consists in the several novel features hereinafter fully set forth and particularly defined in the claims.

The invention is clearly illustrated in the accompanying drawing, in which:

Figure 1, is a top plan of a steering wheel for motor vehicles embodying a simple form of the present invention, part of the rim portion being broken away to illustrate parts thereunder; Fig. 2, is a view partly in side elevation and partly in vertical section taken on the line 2—2 of Fig. 1; Fig. 3, is a view looking at the underside of a fragment of the wheel; and Fig. 4, is a perspective view of one of the spoke extensions.

Referring to said drawing, the reference numeral 5, designates the spider or spoke portion of a steering wheel such as commonly is used upon a "Ford" automobile. In accordance with the common practice, said spider comprises a central hub portion 6, having the usual key ways 7, formed therein, and four spokes 8, radiating from said hub portion. Each spoke is formed upon its free end with an inwardly and downwardly curved rim supporting seat portion 9, for holding the usual rim (not shown) of small diameter, as is common in the steering wheels for "Ford" automobiles. Said downwardly curved or concave portions of the spokes fit against the rounded side of the small rim, and are usually fastened thereto by screws which pass through apertures 10, formed in the seat portions 9.

To adapt the spider of the steering wheel of a "Ford" automobile to a rim of greater diameter than the one usually employed, I provide four spoke extensions 11, (see Fig. 4) which may be made of cast brass or other suitable metal. The lower ends of said spoke extensions are formed with feet 12, having convex, or cylindrical lower bearing surfaces conforming to the concave bearing surfaces of the seat portions 9, of the spokes and adapted to seat thereon as is clearly shown in Fig. 2. The feet are provided with elongated slots 13, extending transversely of the feet and bolts 14, extend through said slots and, through the apertures of the seat portions of the spokes and have nuts 15, threaded upon their ends to rigidly secure the spoke extensions to the spider. The free ends of the spoke extensions 11, are formed with seat portions 16, having downwardly curved or concave bearing faces which conform to the contour of the lower side of the rim 17. Said seat portions 16, are provided with a plurality of apertures 18, through which extend screws 19, for fastening the rim 17, to the spoke extensions.

It is to be noted that said spoke extensions extend upward and outward in radial lines from the seat portions 9, of the spokes, whereby the distance between the bearing faces of the seat portions 16, is increased considerably beyond the bearing faces of the seat portions 9, of the spokes, thereby providing means for receiving and holding a rim of greater diameter than the one ordinarily forming part of the "Ford" or other steering wheel of small diameter.

This improvement is not intended as part of the original equipment of a "Ford" or other automobile, but it has been designed primarily as an extension device which can be quickly and readily substituted for the rim of the ordinary "Ford' or other steering wheel of small diameter so as to increase the diameter of the wheel, thereby providing a more efficient steering wheel. It is comparatively inexpensive in construction, and adds scarcely any additional weight. When the bolts and nuts 14, 15, are screwed up tight, an extremely rigid structure is provided at the ends of the spokes, and because of the concavo-convex bearing surfaces between the end portions of the spokes and the feet of the spoke extensions any turning or twisting of said spoke extensions upon the spokes is entirely eliminated.

By providing the transverse slots in the feet of the spoke extensions, slight variations in the locations of the screw holes in the ends of the spokes are taken care of, thus making it unnecessary to locate said spoke extension with such extreme nicety as might otherwise be necessary. Furthermore, by using brass castings, they may be sprung slightly to bring them into place.

By providing a rim with spoke extensions, the spider of the steering wheel forming part of the original equipment may be left keyed upon the steering post. This obviates the necessity of furnishing an entire wheel including a spider and rim for each of the various makes of automobiles, and avoids the necessity of fitting each particular spider to the particular steering post, thus saving a large amount of money.

I claim as new and desire to secure by Letters Patent:

1. In a steering wheel for motor vehicles, a spider having a plurality of spokes each formed at its end with a concave apertured seat, spoke extensions, one for each spoke and formed at one end with a foot having a convex face, and fixedly secured to the end of a spoke, and a rim fixedly secured to the ends of said spoke extensions.

2. In a steering wheel for motor vehicles, a spider having a plurality of spokes formed with concave seats at their end portions, spoke extensions, one for each spoke, each formed with a foot having a convex lower bearing face adapted to seat upon a seat of a spoke, means for rigidly securing each spoke extension to a spoke, and said spoke extensions, projecting outward in radial directions from the spider, and a rim resting upon the outer end portions of said spoke extensions and fixedly secured thereto.

3. Means for converting a steering wheel of small diameter into one of large diameter, comprising a rim, and a plurality of spoke extensions secured thereto and extending inwardly in radial lines, oblique to the plane of the rim, said spoke extensions having slotted feet at their lower ends, formed with convex lower bearing surfaces adapted to seat upon concave seats of the end portions of the spokes of a steering wheel.

4. Means for converting a steering wheel of small diameter into one of large diameter, comprising a rim, and a plurality of spoke extensions secured thereto and extending inwardly in radial lines, oblique to the plane of the rim, said spoke extensions having feet at their lower ends formed with convex lower bearing surfaces adapted to seat upon concave seats of the ends of spokes of a steering wheel, said feet being formed with transverse slots therein adapted for the reception of screws.

5. In a steering wheel for motor vehicles, a spider having a plurality of spokes, each formed at its end with a concave apertured seat, spoke extensions, one for each spoke, each spoke extension having an apertured foot formed with a convex lower bearing surface adapted to seat upon a concave seat of a spoke, said foot and seat portion being bolted together, and said spoke extension projecting upwardly and outwardly in a radial line from the spoke to which it is bolted and being formed at its free end with a rim seat, and a rim of increased diameter resting on said rim seats of the spoke extensions and screwed thereto.

6. Means for converting a steering wheel of small diameter into one of larger diameter, comprising a spoke extension having a foot at one end formed with a convex lower bearing face, and a transversely extending elongated slot, said spoke extension being formed at its other end with a rim seat concave on its upper side and having at least two screw holes formed therein.

EDWARD E. DAVIS.